United States Patent
Were et al.

(10) Patent No.: US 10,048,660 B2
(45) Date of Patent: Aug. 14, 2018

(54) ENGINE POWER MANAGEMENT USING CURRENT AND STEADY STATE INTAKE MANIFOLD PRESSURE

(71) Applicant: Caterpillar Inc., Peoria, IL (US)

(72) Inventors: Samuel Were, Peoria, IL (US); Tao Yu, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 969 days.

(21) Appl. No.: 14/509,867

(22) Filed: Oct. 8, 2014

(65) Prior Publication Data

US 2016/0102624 A1   Apr. 14, 2016

(51) Int. Cl.
| | |
|---|---|
| G05B 15/02 | (2006.01) |
| F02D 41/10 | (2006.01) |
| F02D 41/04 | (2006.01) |
| F02D 29/02 | (2006.01) |
| G01M 1/38 | (2006.01) |
| G05B 13/00 | (2006.01) |
| G05B 15/00 | (2006.01) |
| G05D 23/00 | (2006.01) |

(52) U.S. Cl.
CPC ............ *G05B 15/02* (2013.01); *F02D 29/02* (2013.01); *F02D 41/045* (2013.01); *F02D 41/10* (2013.01); *F02D 2200/0406* (2013.01)

(58) Field of Classification Search
None
See application file for complete search history.

(56) References Cited

U.S. PATENT DOCUMENTS

| | | | | |
|---|---|---|---|---|
| 4,299,094 A | * | 11/1981 | Lummen | B60H 1/3208 200/81.6 |
| 4,622,939 A | | 11/1986 | Matekunas | |
| 5,769,052 A | | 6/1998 | Oestreicher et al. | |
| 6,408,625 B1 | | 6/2002 | Woon et al. | |
| 6,516,781 B2 | | 2/2003 | Weisman | |
| 7,676,322 B1 | | 3/2010 | Kweon et al. | |
| 8,150,603 B2 | | 4/2012 | Willi et al. | |
| 2002/0195086 A1 | | 12/2002 | Beck et al. | |
| 2008/0236267 A1 | * | 10/2008 | Hartmann | F02D 41/221 73/114.37 |
| 2009/0158831 A1 | | 6/2009 | Cornwell et al. | |

FOREIGN PATENT DOCUMENTS

WO       2014011326 A1    1/2014

* cited by examiner

*Primary Examiner* — Eric C Wai
(74) *Attorney, Agent, or Firm* — Miller, Matthias & Hull (57) ABSTRACT

A load management system for reducing engine lug during transient conditions is disclosed. The load management system may include a driven component, a power source configured to drive the driven component, and a controller in communication with the driven component and the power source. The controller may be configured to: monitor a current intake manifold pressure of the power source and a current load of the driven component, calculate a ratio based on the current intake manifold pressure and a steady state intake manifold pressure of the power source, and start a predetermined time period based on the ratio and the current load during which the power source builds up power to respond to the current load.

20 Claims, 7 Drawing Sheets

ENGINE POWER MANAGEMENT USING CURRENT AND STEADY STATE INTAKE MANIFOLD PRESSURE

FIELD OF THE DISCLOSURE

The present disclosure relates generally to load management systems and, more particularly, to systems and methods for managing loads in transient conditions.

BACKGROUND OF THE DISCLOSURE

A power source may be used to drive generators and machines. The power source may be, for example, an engine, such as a diesel engine, gasoline engine, natural gas engine, or any other source of mechanical or rotational energy. A generator converts mechanical power received from the engine into electrical power.

Examples of machines may include excavators, loaders, dozers, motor graders, haul trucks, and other types of heavy machinery used for a variety of tasks. The power source provides the power required to complete these tasks. For example, a machine may include an engine-driven pump that provides high pressure fluid to move actuators associated with an implement or traction devices of the machine. In another example, the machine may include a transmission that converts engine torque to drive traction devices, such as wheels or tracks that propel the machine.

Ideally, the engine drives the generator or machine with a relatively constant torque and speed. However, external changes in load on the generator or machine may be severe enough to affect engine operation and cause engine lugging. Engine lugging, or excessive engine speed droop, may decrease the productivity and efficiency of the engine.

For example, in the case of the generator, an external electrical load may suddenly be applied to the generator, which subsequently demands an increased power from the engine to provide the increase in electrical power demand. As a result of the sudden increased electrical load, the engine may lug, or decrease in speed as the torque load increases. Similarly, in the example of the engine-driven pump, an operator or particular operational situation of the machine may require an increased amount of power from the engine to drive the pump. If this increased amount in power demand exceeds an immediate output capacity of the engine, then the engine may experience lugging.

In the case of the machine transmission, when a sudden increase in torque is required at a faster output speed than an immediate capacity of the engine, then the engine may lug or engine speed may droop. With all these examples, as a result of engine lugging, the generator, pump, or transmission may produce undesirable fluctuations in output as a response to the sudden increase in load.

Operating techniques for a turbocharged internal combustion engine to better accommodate load changes are disclosed in U.S. Pat. No. 6,408,625, entitled, "Operating Techniques for Internal Combustion Engines." The '625 patent describes preparing an engine to accept a generator load by increasing boost pressure provided by the compressor. More specifically, the boost pressure increase is accomplished in the '625 patent by skip-firing the cylinders in a selected pattern, retarding ignition timing for the cylinders, or a combination of these techniques. The '625 patent also describes a controller configured to generate a signal to indicate that the engine is ready to accept block loading from the generator.

However, the '625 controller only manages power on the engine side of a generator set. Accordingly, there is a need to provide a control system and method that manages power on the generator side to reduce engine lug, and which can be applied to both generators and machines.

SUMMARY OF THE DISCLOSURE

In accordance with one embodiment, a load management system for reducing engine lug during transient conditions is disclosed. The load management system may include a driven component, a power source configured to drive the driven component, and a controller in communication with the driven component and the power source. The controller may be configured to: monitor a current intake manifold pressure of the power source and a current load of the driven component, calculate a ratio based on the current intake manifold pressure and a steady state intake manifold pressure of the power source, and start a predetermined time period based on the ratio and the current load during which the power source builds up power to respond to the current load.

In accordance with another embodiment, a method to control a load of a driven component is disclosed. The method reduces engine lug in a power source during transient conditions. The power source may be configured to drive the driven component. The method may include a controller monitoring a current intake manifold pressure of the power source; the controller monitoring a current load of the driven component; the controller retrieving a steady state intake manifold pressure of the power source from a memory associated with the controller; the controller calculating a ratio of the current intake manifold pressure to the steady state intake manifold pressure; the controller starting a predetermined time period based on the ratio and the current load; and the controller determining a transient power value during the predetermined time period based at least in part on the ratio.

In accordance with yet another embodiment, a controller for a driven component is disclosed. The driven component may be operatively connected to a power source configured to drive the driven component. The controller may include a timer, a current load module configured to determine a current load of the driven component, a transient state module, and a load management module. The transient state module may be configured to: monitor a current intake manifold pressure of the power source and the current load of the driven component, calculate a ratio based on the current intake manifold pressure and a steady state intake manifold pressure of the power source, start the timer for a predetermined time period based on the ratio and the current load, and during the predetermined time period, determine a transient power value based at least in part on the ratio. The load management module may be configured to manage the current load of the driven component in transient conditions using the transient power value during the predetermined time period.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
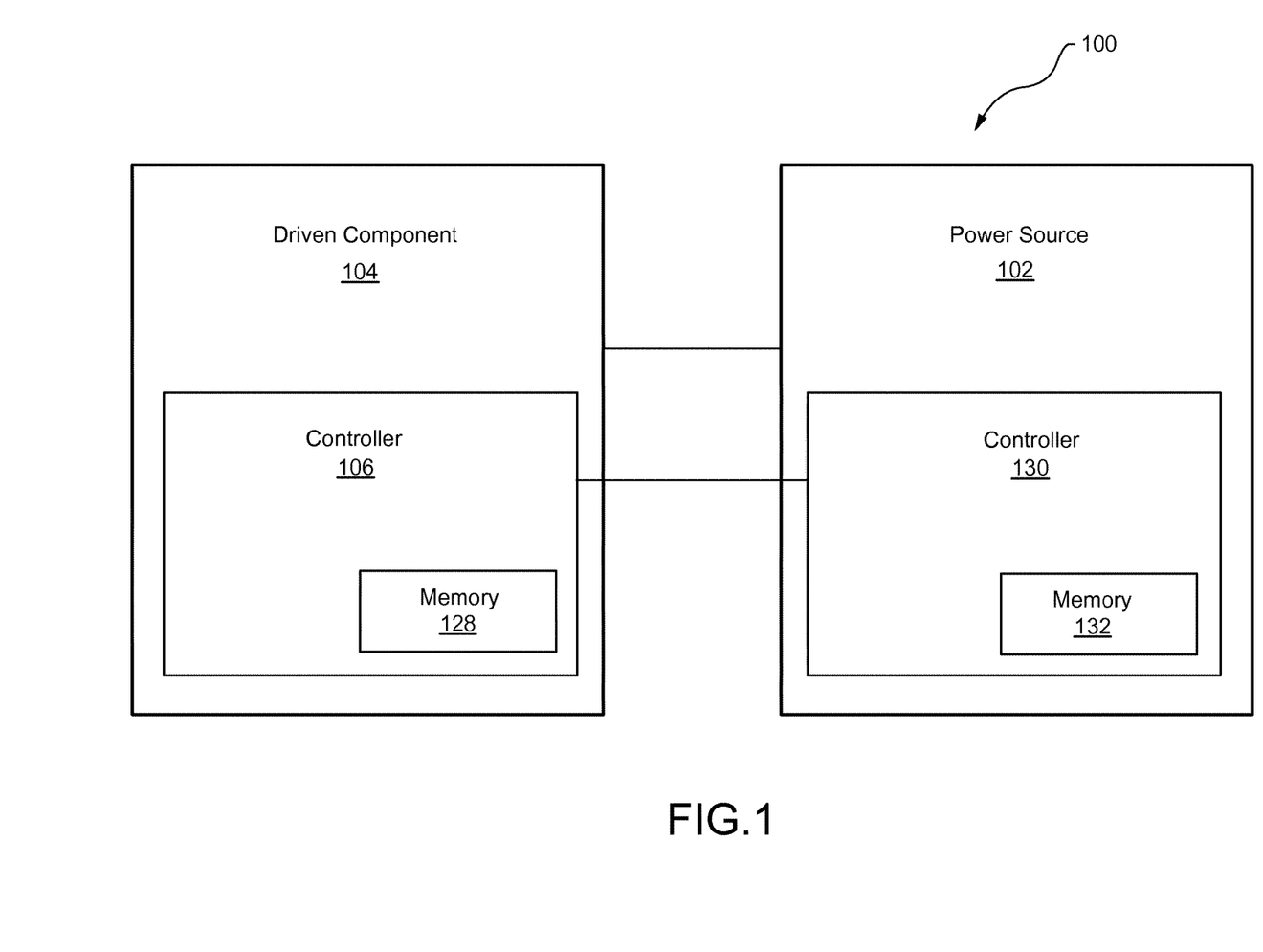
FIG. 1 is a diagrammatic view of a load management system, in accordance with one embodiment of the present disclosure.
Figure 2:
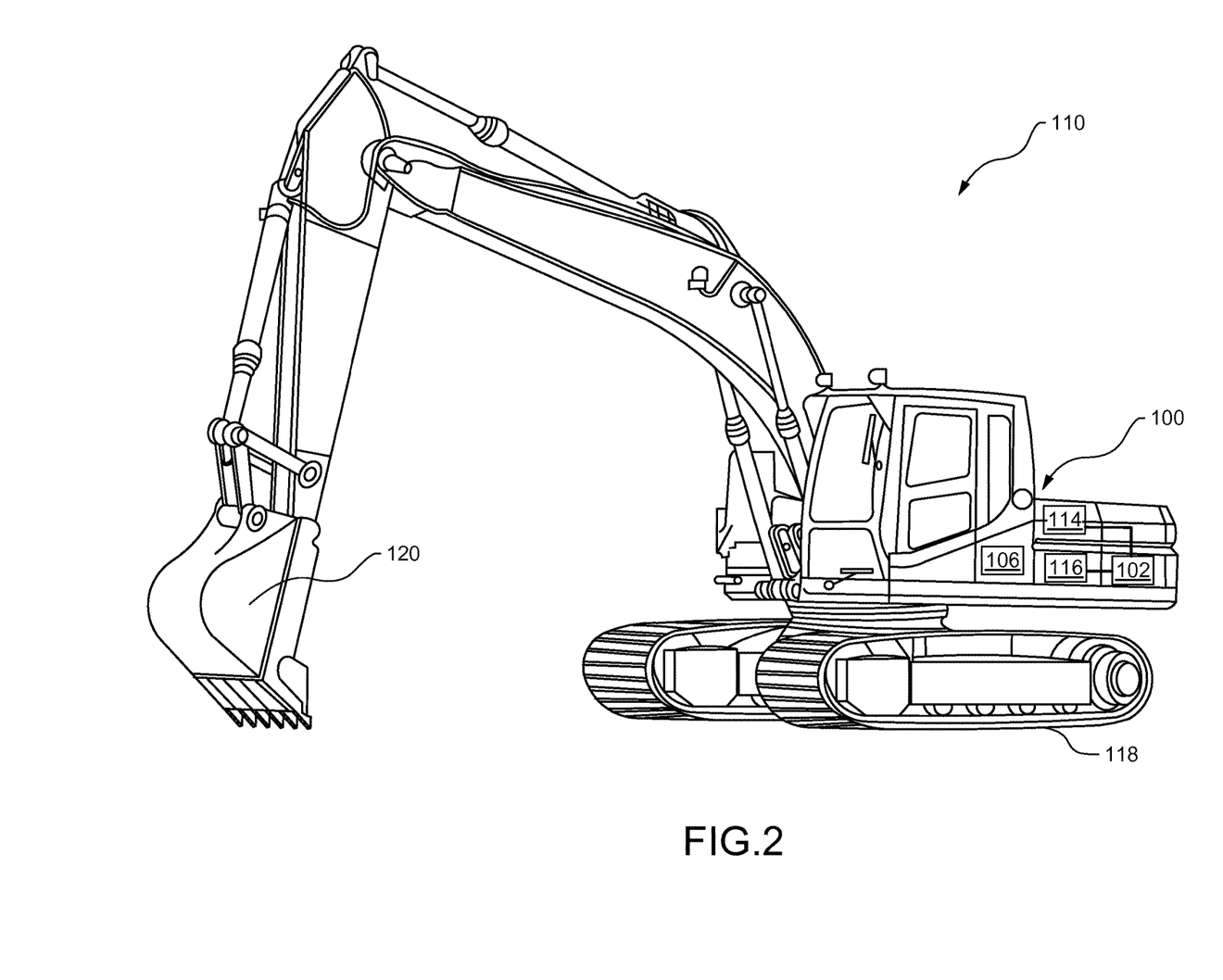
FIG. 2 is a diagrammatic view of a machine including the load management system of FIG. 1.
Figure 3:
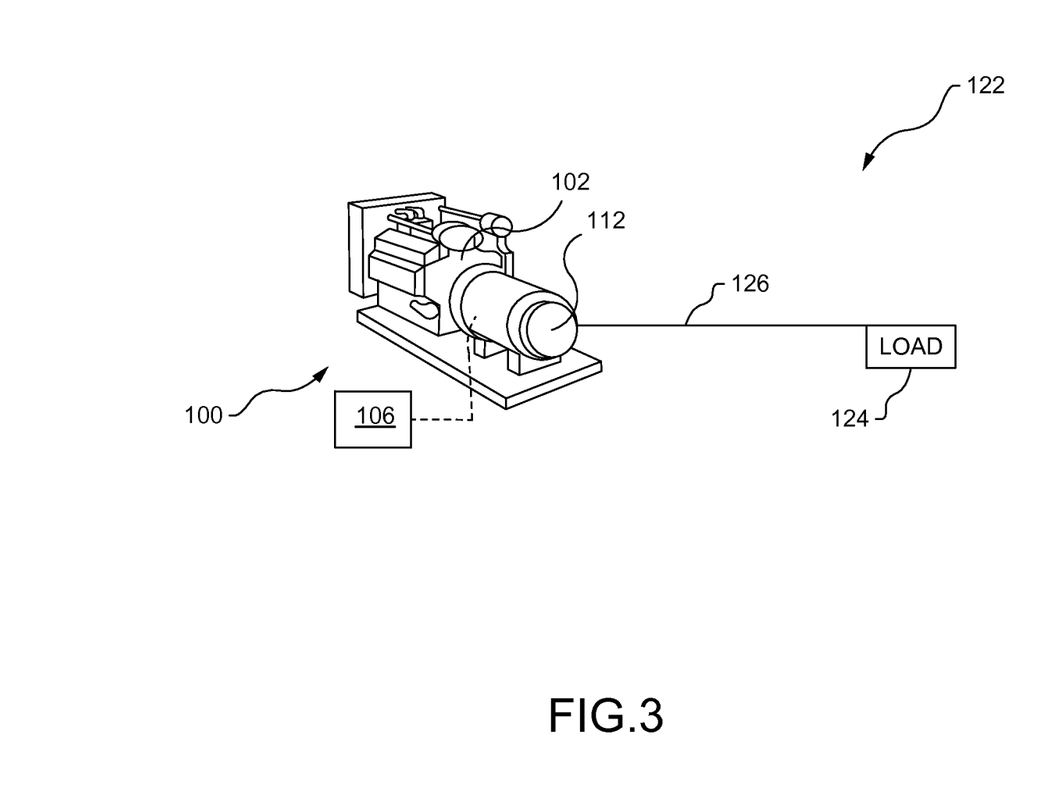
FIG. 3 is a diagrammatic view of a generator set including the load management system of FIG. 1.

FIGS. 1-3 schematically illustrate a load management system 100 for reducing engine lug in transient conditions. The load management system 100 may comprise a power source 102 configured to drive a driven component 104 and a controller 106 in communication with the power source 102 and the driven component 104. For example, the controller 106 of the load management system 100 may be used to manage a load of the driven component 104 such that the power source 102 does not experience lugging, or an excessive speed droop.

The power source 102 may comprise, for example, an engine, such as a diesel engine, gasoline engine, natural gas engine, or any other source of mechanical or rotational energy. The power source 102 may provide mechanical power to the driven component 104. The driven component 104 may comprise, for example, a machine 110 (FIG. 2), a generator 112 (FIG. 3), or any other component that may be driven by the power source 102.

As shown in FIG. 2, the power source 102 may be used to provide power to the machine 110. Although the machine 110 is illustrated as a hydraulic excavator, the machine 110 may be of any other type. As used herein, the term "machine" refers to a mobile machine that performs a driven operation involving physical movement associated with a particular industry, such as, without limitation, construction, landscaping, mining, agriculture, transportation, forestry, etc.

Non-limiting examples of machines include commercial and industrial machines, such as, excavators, loaders, dozers, motor graders, tractors, trucks, earth-moving vehicles, mining vehicles, backhoes, material handling equipment, agricultural equipment, marine vessels, on-highway vehicles, and other types of machines that operate in a work environment. It is to be understood that the machine 110 is shown primarily for illustrative purposes to assist in disclosing features of various embodiments, and that FIG. 2 does not depict all of the components of a machine.

The machine 110 may include a transmission 114 and one or more pumps 116. Each of the transmission 114 and the pumps 116 may be operatively coupled to the power source 102. The transmission 114 may transmit torque generated by the power source 102 over a wide range of speeds to drive traction devices, such as wheels or tracks 118 that propel the machine 110. The load management system 100 may be used with the transmission 114 to manage a load on the transmission 114, or transmission load, which is subsequently met by a power output of the power source 102.

The pumps 116 may comprise, without limitation, engine-driven pumps in a hydraulic system or a pneumatic system that convert mechanical power generated by the power source 102 into, for example, hydraulic or pneumatic power via high pressure fluid. The high pressure fluid may be used to move actuators associated with a bucket 120 or other implement of the machine 110, as well as to move the tracks 118, or other traction devices, of the machine 110. The load management system 100 may be used with the pumps 116 to manage a load on the pumps 116, or pump load, which is subsequently met by a power output of the power source 102.

As shown in FIG. 3, the power source 102 may be used to provide power to a generator set 122. In the generator set 122, the power source 102 or prime mover may be operatively coupled to mechanically rotate the generator 112. The generator 112 may convert mechanical power received from the power source 102 into electrical power. The electrical power produced by the generator 112 may be directed to an external load 124 via one or more transmission lines 126. For example, generator 112 may comprise, without limitation, an alternating current (AC) induction generator, a permanent magnet generator, an AC synchronous generator, a switched reluctance generator, or any other type of generator. The load management system 100 may be used with the generator 112 to manage the external load 124 on the generator 112, or generator load, which is subsequently met by a power output of the power source 102.

More specifically, when there is an increase in load, such as, an increase in transmission load, pump load, or generator load, on the driven component 104, e.g., machine 110 or generator 112, the load management system 100 may reduce lug during this transient condition. The controller 106 (FIG. 1) of the load management system 100 may be implemented using one or more of a processor, a microprocessor, a microcontroller, a digital signal processor (DSP), a field-programmable gate array (FGPA), an electronic control module (ECM), an electronic control unit (ECU), and a processor-based device that may include or be associated with a non-transitory computer readable storage medium having stored thereon computer-executable instructions, or any other suitable means for electronically controlling functionality of the load management system 100.

The controller 106 may be configured to operate according to predetermined algorithms or sets of instructions for operating the power source 102 and the driven component 104. Such algorithms or sets of instructions may be programmed or incorporated into a memory 128 (FIG. 1) that is associated with or at least accessible to the controller 106. The memory 128 may be provided within and/or external to the controller 106, and may comprise a non-volatile memory. It is understood that the load management system 100 and controller 106 may include other hardware, software, firmware, or combinations thereof.

In addition, the load management system 100 may comprise more than one controller 106. For example, as shown in FIG. 1, the controller 106 may be associated with the driven component 104, while another controller 130 may be associated with the power source 102. The controller 130 of the power source 102 may have a memory 132 and may be in communication with the controller 106 of the driven component 104. For instance, the controller 130 may be, without limitation, an engine control unit or engine control module. However, other configurations may certainly be used. In another example, the load management system 100 may comprise a single controller for both the power source 102 and the driven component 104.

Figure 4:
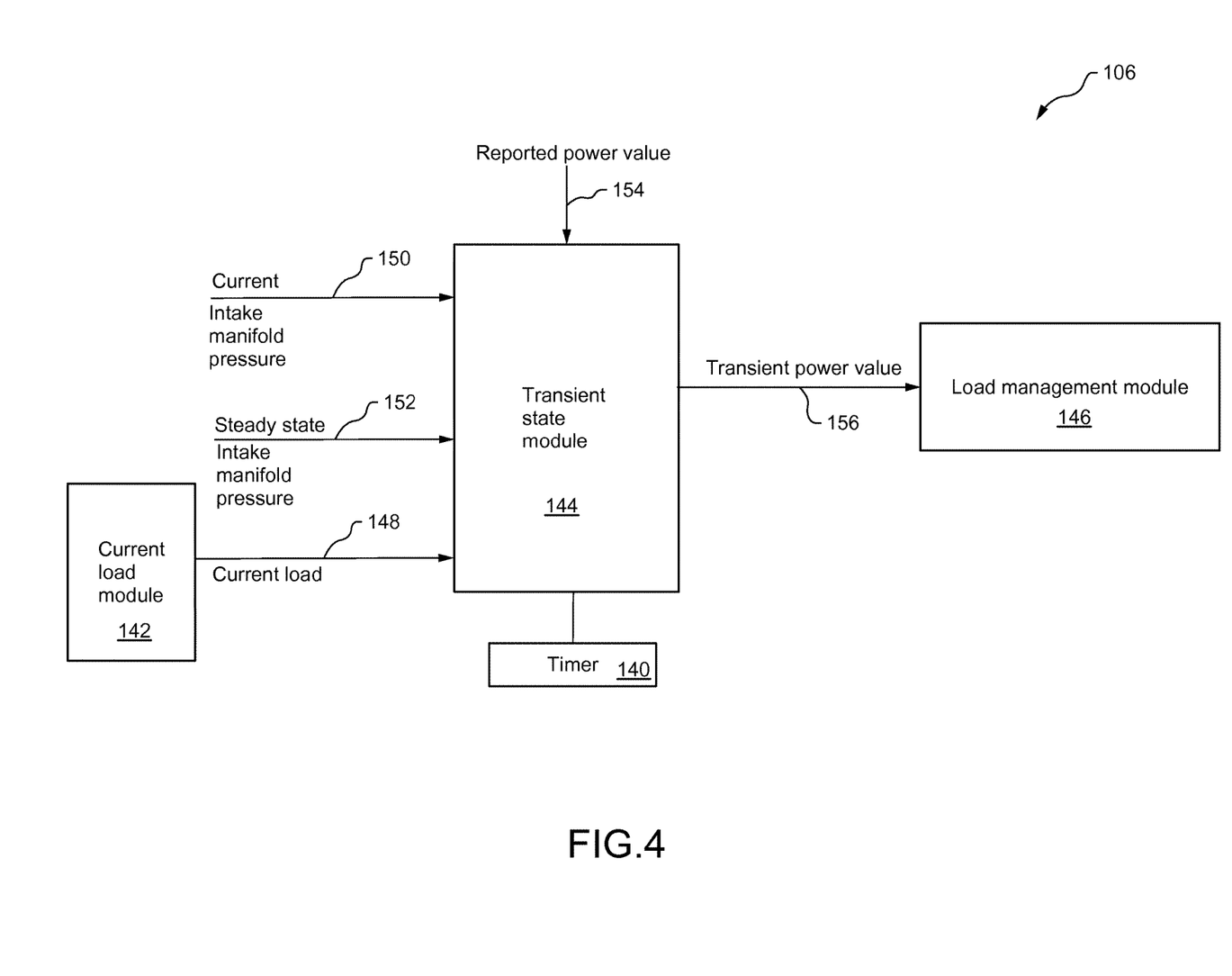
FIG. 4 is a diagrammatic view of a controller of the load management system of FIG. 1.

Referring now to FIG. 4, with continued reference to FIGS. 1-3, the controller 106 may be programmed to include a timer 140, a current load module 142, a transient state module 144, and a load management module 146. The timer 140 may be configured to measure an amount of time that has elapsed. For example, the timer 140 may receive a command from the transient state module 144 to start tracking a predetermined time period. Once the predetermined time period has elapsed, the timer 140 may send a signal to the transient state module 144 indicating the predetermined time period has elapsed.

The current load module 142 may be configured to determine a current load 148 of the driven component 104 based on operating characteristics of the driven component 104. The current load 148 may refer to an actual load of the driven component 104 at a present moment in time. The transient state module 144 may use the current load 148 from the current load module 142, as well as other parameters in order to determine a transient power value 156. The other parameters the transient state module 144 uses to output the transient power value 156 may include a current intake manifold pressure 150, a steady state intake manifold pressure 152, and a reported power value 154.

Figure 5:
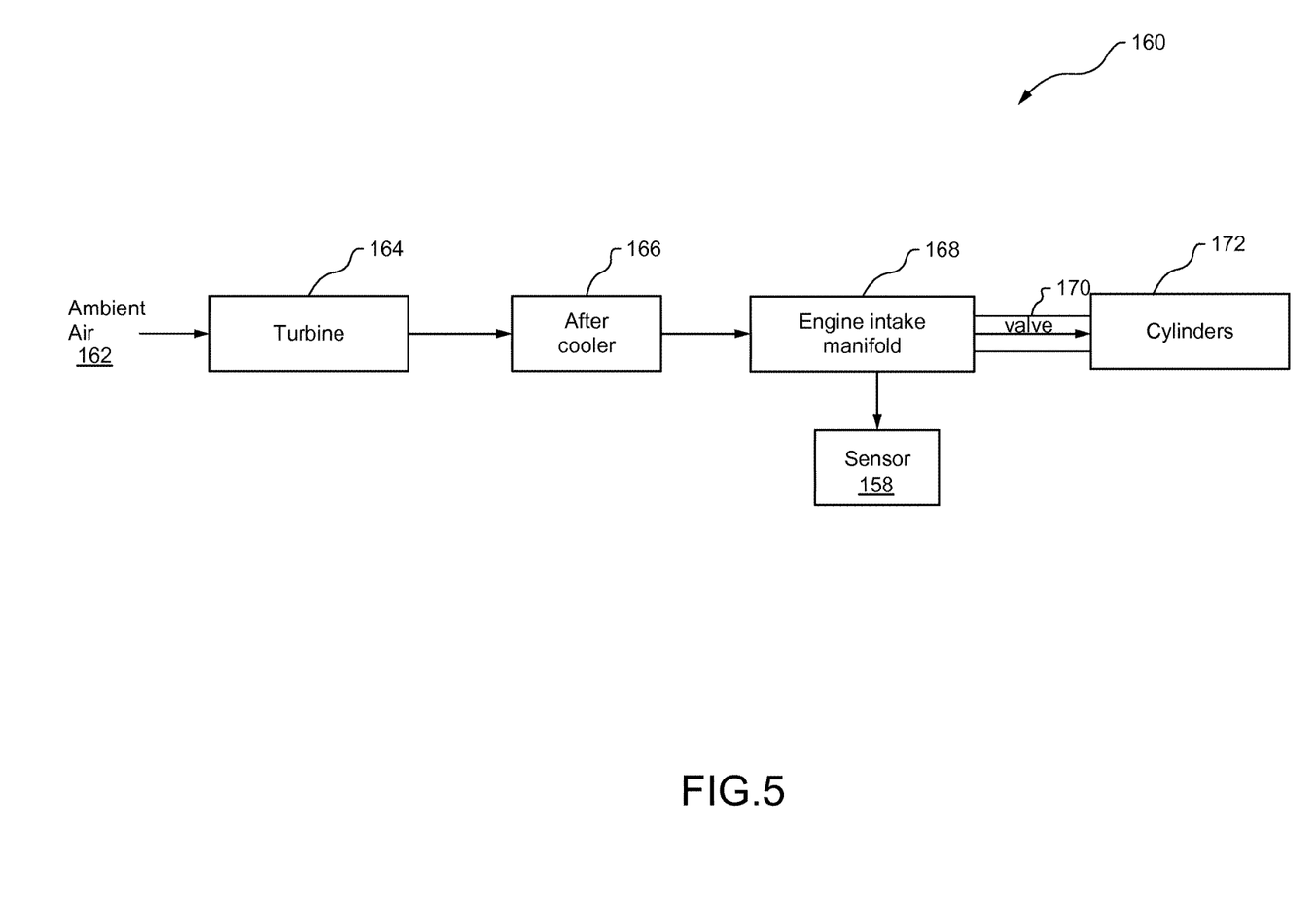
FIG. 5 is a flow diagram of a power source, in accordance with another embodiment.

An intake manifold pressure sensor 158 may be configured to measure the current intake manifold pressure 150 of the power source 102 or engine. More specifically, as shown in an example flow diagram 160 for the power source 102, in FIG. 5, ambient air 162 may be compressed through a turbine 164. The turbine 164 may then push the compressed air into an after cooler 166. The after cooler 166 may cool the compressed air to a predetermined temperature, and the air may subsequently enter an intake manifold 168. Depending on an opening of a cylinder valve 170, the air is forced from the intake manifold 168 into cylinders 172 where combustion takes place.

The intake manifold pressure sensor 158 may measure a current pressure of the air inside the intake manifold 168, and may send a signal indicative of the current intake manifold pressure 150 to the controller 106. It is to be understood that the flow diagram 160, in FIG. 5, may include more or less components than that shown. Furthermore, other configurations than the intake manifold pressure sensor 158 may be used to measure the current intake manifold pressure 150. The load management system 100 may also use air pressures from other components of the flow diagram 160 instead of or in addition to the current air pressure measured in the intake manifold 168.

The steady state intake manifold pressure 152 may be stored in the memory 128 associated with the controller 106. For example, intake manifold pressure data of the power source 102 in steady state may be stored in memory 128, such as in the form of a lookup table. The controller 106 may receive a current speed and a current fuel of the power source 102, such as, from the controller 130 of the power source 102. Based on the current speed and current fuel of the power source 102, the controller 106 may retrieve the corresponding steady state intake manifold pressure 152 from the lookup table in memory 128.

The reported power value 154 may refer to a maximum available power reported from the power source 102, such as, without limitation, a reported maximum available engine power in steady state conditions. For example, maximum available power data of the power source 102 in steady state may be stored in the memory 132 associated with the controller 130, such as in the form of a lookup table. Based on current fuel and pressure conditions of the power source 102, the controller 130 may retrieve the corresponding maximum available power, which may then be reported or sent to the controller 106 of the driven component 104 as the reported power value 154.

The transient state module 144 may use the current load 148, current intake manifold pressure 150, steady state intake manifold pressure 152, and reported power value 154 to determine a transient power value 156 during the predetermined time period. The load management module 146 may use the transient power value 156 determined by the transient state module 144 in order manage transient loading on the driven component 104 and reduce lug of the power source 102 during sudden load increases. For example, based at least in part on the transient power value 156, the load management module 146 of the controller 106 may send signals to various components of the power source 102 and/or driven component 104 in order to handle the sudden load increases and prevent excessive engine speed droop.

INDUSTRIAL APPLICABILITY

In general, the foregoing disclosure finds utility in various industrial applications, such as, in earthmoving, construction, industrial, agricultural, and forestry machines. In particular, the disclosed load management system may be applied to generator sets, generators, excavators, loaders, dozers, motor graders, tractors, trucks, earth-moving vehicles, mining vehicles, backhoes, material handling equipment, agricultural equipment, marine vessels, on-highway vehicles, and the like. By applying the disclosed load management system to a machine or generator, excessive engine lug may be reduced during transient conditions. Furthermore, the disclosed load management system manages load on the driven component and can be used with both machines and generators. In so doing, the disclosed system may be used with any type of engine for either machine or generator applications.

Figure 6:
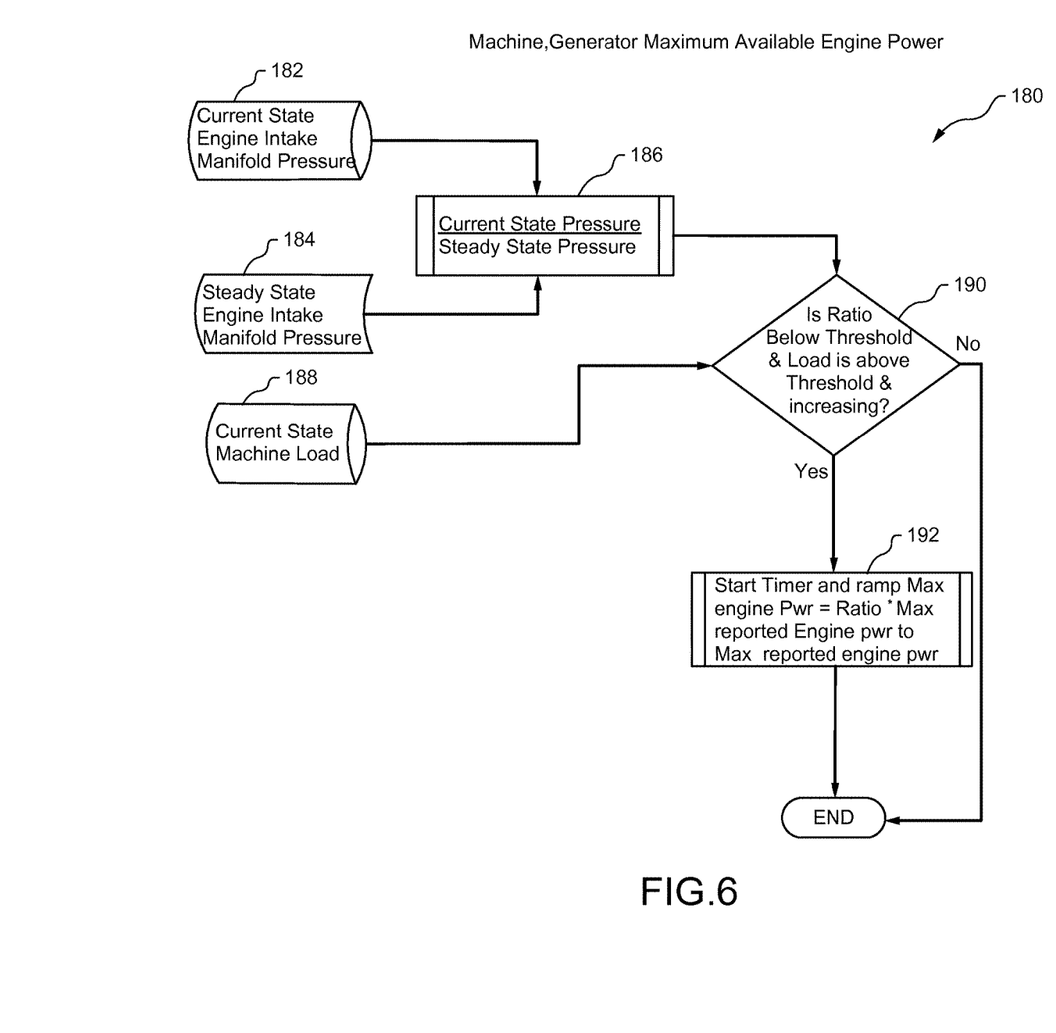
FIG. 6 is a flowchart illustrating a process to control a load of a driven component, in accordance with another embodiment.

Turning now to FIG. 6, with continued reference to FIGS. 1-5, a flowchart illustrating an example algorithm or process 180 to control a load of a driven component in order to reduce engine lug in a power source during transient conditions is shown, in accordance with another embodiment. The algorithm or process 180 may be included in the controller of the load management system. For example, the algorithm or process 180 may be programmed into the memory of the controller associated with the driven component, such as, in the transient state module in order to trigger the timer to start the predetermined time period and determine the transient power value.

At block 182, the current intake manifold pressure of the power source is measured, for example, by the intake manifold pressure sensor. At block 184, the controller retrieves from memory the steady state intake manifold pressure. The controller calculates a ratio of the current intake manifold pressure to the steady state intake manifold pressure, at block 186. At block 188, a current load of the driven component is determined. The controller may compare the ratio calculated at block 186 to a predetermined ratio threshold, at block 190. In addition, at block 190, the controller may compare the current load to a predetermined load threshold, and may determine if the current load is increasing.

The predetermined ratio threshold and the predetermined load threshold may be determined by data gathered from testing of the driven component and the power source. Specific values for the predetermined ratio threshold and predetermined load threshold may be programmed into the memory associated with the controller. For example, the predetermined ratio threshold may be ninety-nine percent (99%) or any value below ninety-nine percent. In one embodiment, the predetermined ratio threshold may be between an inclusive range of ninety to ninety-five percent (90-95%). The predetermined load threshold, for example, may be between an inclusive range of ten to twenty percent (10-20%) of a maximum load, or rating, of the driven component. However, other values for the predetermined ratio threshold and the predetermined load threshold are certainly possible.

The controller monitors the current intake manifold pressure and the current load. More specifically, at block 190, the controller determines if the ratio of the current intake manifold pressure to the steady state intake manifold pressure is below the predetermined ratio threshold, if the current load is above the predetermined load threshold, and if the current load is increasing. If one of these conditions is not true, the process 180 ends. If all of the conditions are true, at block 190, then the controller may determine a sudden increase in load during transient operation.

If the ratio is below the predetermined ratio threshold, the current load is above the predetermined load threshold, and the current load is increasing, then the controller triggers the timer to start the predetermined time period, at block 192. For example, the predetermined time period may be between an inclusive range of 120 milliseconds to 150 milliseconds, although other values for the predetermined time period are certainly possible. The predetermined time period may allow the power source to build up brake mean effective pressure (BMEP) when the timer is triggered.

More specifically, when the controller determines a sudden increase in load, the controller gives the power source time to increase engine power in order to meet the load requirement without causing lug. Thus, during the predetermined time period, rather than the increased load being immediately transferred to the power source, the controller may allow the power source to build BMEP or reach maximum power capacity to handle the increased load. In so doing, excessive speed droop is prevented.

During the predetermined time period, the controller determines the transient power value. The transient power value may be a modified value for the reported maximum available engine power. Since the reported maximum available engine power applies to steady state conditions, the transient power value may modify that reported engine power value to accommodate for transient conditions. The load management system may then use the transient power value to manage load on the driven component during the predetermined time period, instead of immediately using the reported maximum available engine power in heavy loading conditions.

For example, the controller may calculate a scaled power value by multiplying the reported power value with the ratio. At a start of the predetermined time period, the transient power value may be equal to the scaled power value. With the scaled power value being less than the reported maximum available engine power, the load management system may prevent the power from being immediately overloaded.

The controller may then ramp up the transient power value from the scaled power value to the reported power value over the predetermined time period. At an end of the predetermined time period, the transient power value may be equal to the reported power value. More specifically, the transient power value may increase incrementally from the scaled power value to the reported power value with each clock cycle of the timer.

Figure 7:
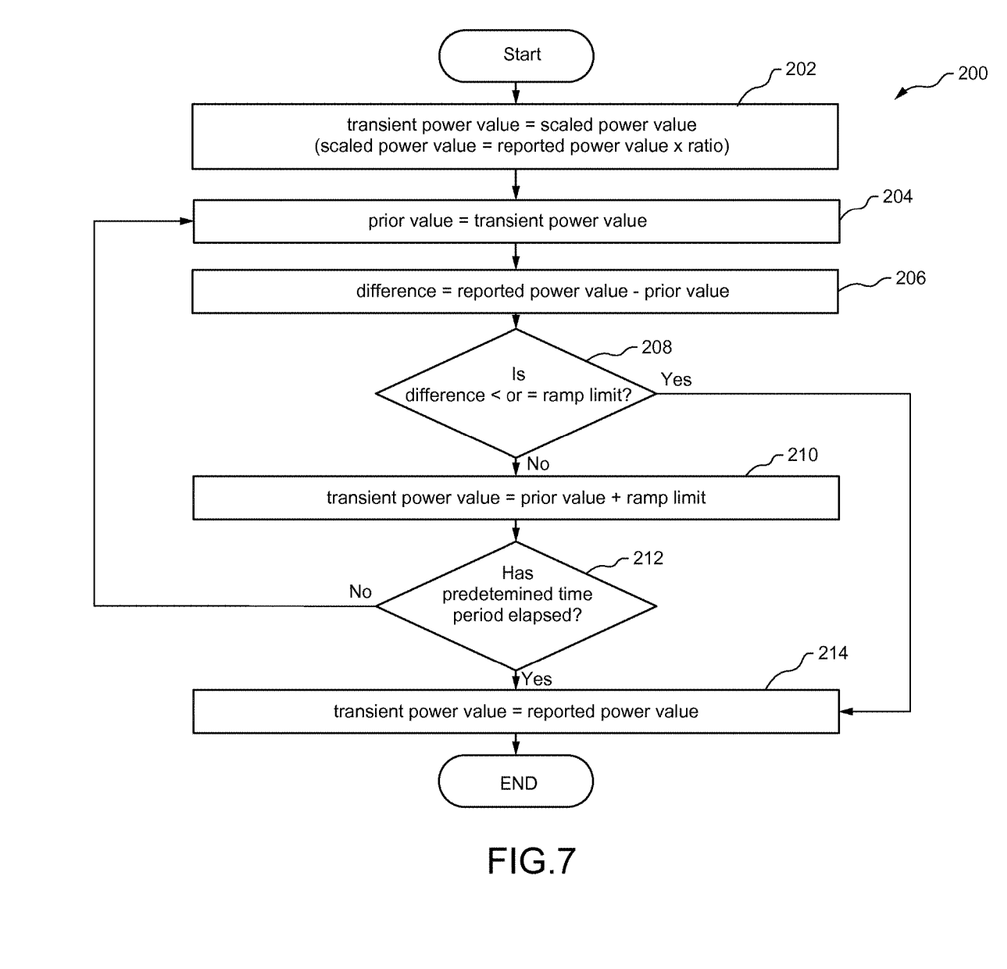
FIG. 7 is a flowchart illustrating a process for ramping up a transient power value over a predetermined time period, in accordance with yet another embodiment.

Referring now to FIG. 7, with continued reference to FIGS. 1-6, a flowchart illustrating an example algorithm or process 200 for ramping up the transient power value over the predetermined time period is shown, in accordance with yet another embodiment. At block 202, the transient power value is set to the scaled power value. At block 204, a prior value is set to the transient power value. At block 206, a difference between the reported power value and the prior value may be determined.

The controller may then determine an increment to add to the prior value in order to increase the transient power value without exceeding a ramp limit of the system, at block 208. If the difference is less than or equal to the ramp limit, then the process 200 proceeds to block 214, and the transient power value is set to the reported power value. If the difference is greater than the ramp limit, then the increment may be the ramp limit, and the transient power value may be equal to the prior value plus the ramp limit, at block 210.

At block 212, using signals from the timer, the controller determines whether the predetermined time period has elapsed. If the predetermined time period has not elapsed, then the process proceeds to block 204, and the transient power value is increased incrementally with each clock cycle of the timer. It the predetermined time period has elapsed, then the process proceeds to block 214, and the transient power value is set to the reported power value.

It is to be understood that the flowcharts in FIGS. 6 and 7 are shown and described as examples only to assist in disclosing the features of the load management system, and that more or fewer steps that shown, in a same or different order, may be included in the method corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A load management system for reducing engine lug during transient conditions, the load management system comprising:
a driven component;
a power source configured to drive the driven component, the power source including an intake manifold; and a controller in communication with the driven component and the power source, the controller configured to:
monitor a current intake manifold pressure of the intake manifold of the power source and a current load of the driven component,
calculate a ratio based on the current intake manifold pressure and a steady state intake manifold pressure of the power source,
compare the ratio to a predetermined ratio threshold,
compare the current load to a predetermined load threshold to determine if the current load is increasing,
start a predetermined time period based on the ratio and the current load, wherein the predetermined time period starts when the ratio is below the predetermined ratio threshold, the current load is above the predetermined load threshold, and the current load is increasing, and
increase power incrementally to the power source to control the current load of the driven component during the predetermined time period.

2. The load management system of claim 1, wherein the controller is further configured to calculate a scaled power value based on the ratio and a reported power value of the power source.

3. The load management system of claim 2, wherein the reported power value is a maximum available power of the power source at current fuel and pressure conditions in steady state.

4. The load management system of claim 3, wherein the controller is farther configured to determine a transient power value during the predetermined time period.

5. The load management system of claim 4, wherein the transient power value is equal to the scaled power value at a beginning of the predetermined time period, and the transient power value is equal to the reported power value at an end of the predetermined time period.

6. The load management system of claim 5, wherein the controller is further configured to incrementally increase the transient power value from the scaled power value to the reported power value over the predetermined time period.

7. The load management system of claim 1, wherein the driven component is a machine and the power source is an engine.

8. A method to control a load of a driven component to reduce engine lug in a power source during transient conditions, the power source configured to drive the driven component, the method comprising:
monitoring, by a controller, a current intake manifold pressure of an intake manifold of the power source;
monitoring, by the controller, a current load of the driven component;
retrieving, by the controller, a steady state intake manifold pressure of the power source from a memory associated with the controller;
calculating, by the controller, a ratio of the current intake manifold pressure to the steady state intake manifold pressure;
starting, by the controller, a predetermined time period based on the ratio and the current load, wherein the controller starts the predetermined time period when the ratio is below a predetermined ratio threshold, the current load is above a predetermine load threshold, and the current load is increasing;
determining, by the controller, a transient power value during the predetermined time period based at least in part on the ratio, and
managing, by the controller, the current load of the driven component, during the predetermined time period, based on the transient power value.

9. The method of claim 8, further comprising receiving, by the controller, a reported power value of the power source, and the controller determining the transient power value during the predetermined time period based at least in part on the reported power value.

10. The method of claim 9, further comprising calculating, by the controller, a scaled power value based on the ratio and the reported power value, the transient power value being equal to the scaled power value at a start of the predetermined time period.

11. The method of claim 10, further comprising ramping, by the controller, up the transient power value over the predetermined time period to the reported power value.

12. The method of claim 8, wherein the controller is further configured to compare the ratio to a predetermined ratio threshold.

13. The method of claim 8, wherein the controller is further configured to compare the current load to a predetermined load threshold.

14. A controller for a driven component operatively connected to a power source configured to drive the driven component, the controller comprising:
a timer;
a current load module configured to determine a current load of the driven component;
a transient state module configured to:
monitor a current intake manifold pressure of an intake manifold of the power source and the current load of the driven component,
calculate a ratio based on the current intake manifold pressure and a steady state intake manifold pressure of the power source,
start the timer for a predetermined time period based on the ratio and the current load, when the ratio is below a predetermined ratio threshold, the current load is above a predetermined load threshold, and the current load is increasing, and
during the predetermined time period, determine a transient power value based at least in part on the ratio; and
a load management module configured to manage the current load of the driven component in transient conditions using the transient power value during the predetermined time period.

15. The controller of claim 14, wherein the transient state module is further configured to calculate a scaled power value by multiplying a reported power value of the power source with the ratio.

16. The controller of claim 15, wherein the transient power value is equal to the scaled power value at a start of the predetermined time period, and wherein the transient state module is further configured to ramp up the transient power value from the scaled power value to the reported power value over the predetermined time period.

17. The controller of claim 14, wherein the controller is further configured to compare the ratio to a predetermined ratio threshold.

18. The controller of claim 14, wherein the controller is further configured to compare the current load to a predetermined load threshold.

19. The controller of claim 14, wherein the controller is further configured to determine if the current load is increasing.

20. The controllers of claim 14, wherein the controller is further configured to start the predetermined time period when the ratio is below the predetermined ratio threshold, the current load is above the predetermined load threshold, and the current load is increasing.

\* \* \* \* \*